United States Patent
Emeott et al.

(10) Patent No.: US 7,706,822 B2
(45) Date of Patent: Apr. 27, 2010

(54) TIMING SYNCHRONIZATION AND BEACON GENERATION FOR MESH POINTS OPERATING IN A WIRELESS MESH NETWORK

(75) Inventors: Stephen P. Emeott, Rolling Meadows, IL (US); Hrishikesh Gossian, Apopka, FL (US)

(73) Assignee: Motorola, Inc., Schaumburg, IL (US)

( * ) Notice: Subject to any disclaimer, the term of this patent is extended or adjusted under 35 U.S.C. 154(b) by 730 days.

(21) Appl. No.: 11/460,017

(22) Filed: Jul. 26, 2006

(65) Prior Publication Data

US 2007/0050523 A1   Mar. 1, 2007

Related U.S. Application Data

(60) Provisional application No. 60/711,073, filed on Aug. 24, 2005.

(51) Int. Cl.
*H04B 15/00* (2006.01)
(52) U.S. Cl. .................. 455/502; 370/350; 370/503; 375/272; 375/354
(58) Field of Classification Search .................. 455/502
See application file for complete search history.

(56) References Cited

U.S. PATENT DOCUMENTS

| | | | | |
|---|---|---|---|---|
| 6,842,460 B1 * | 1/2005 | Olkkonen et al. | ............ | 370/465 |
| 6,928,467 B2 * | 8/2005 | Peng | ............ | 709/219 |
| 7,089,298 B2 * | 8/2006 | Nyman et al. | ............ | 709/220 |
| 7,151,945 B2 * | 12/2006 | Myles et al. | ............ | 455/502 |
| 7,224,970 B2 * | 5/2007 | Smith et al. | ............ | 455/434 |
| 7,239,626 B2 * | 7/2007 | Kandala et al. | ............ | 370/349 |
| 7,239,844 B2 * | 7/2007 | Fischer | ............ | 455/3.01 |
| 7,286,515 B2 * | 10/2007 | Olson et al. | ............ | 370/338 |
| 7,295,542 B2 * | 11/2007 | Xu | ............ | 370/338 |
| 7,330,459 B2 * | 2/2008 | Chen et al. | ............ | 370/350 |

(Continued)

FOREIGN PATENT DOCUMENTS

WO   03075488 A2   9/2003

OTHER PUBLICATIONS

Changsu et al., "Enhanced Power saving for IEEE 802.11 WLAN with Dynamic Slot Allocation", 2005, Springer-Verlag Berlin Heidelberg, pp. 498-507.*

(Continued)

*Primary Examiner*—Duc Nguyen
*Assistant Examiner*—Hai V Nguyen
(74) *Attorney, Agent, or Firm*—Randi L. Karpinia; Jim Lamb

(57) ABSTRACT

A method is used by a mesh point that includes one or more step of receiving one of a beacon and probe response from an other mesh point; setting a state of whether the mesh point is already synchronized with one or more peers to true and performing a beacon timing synchronization function when the mesh point is in the unsynchronized state and the other mesh point requests synchronization from a peer mesh point; adding an identity of the other mesh point to a database of beacon senders maintained by the mesh point and performing a beacon timing synchronization function when the mesh point and the other mesh point are both synchronized; and providing indications of whether the mesh point supports synchronization, requests synchronization from a peer mesh point, and is already synchronized with one or more peer.

13 Claims, 4 Drawing Sheets

U.S. PATENT DOCUMENTS

Figure 1:
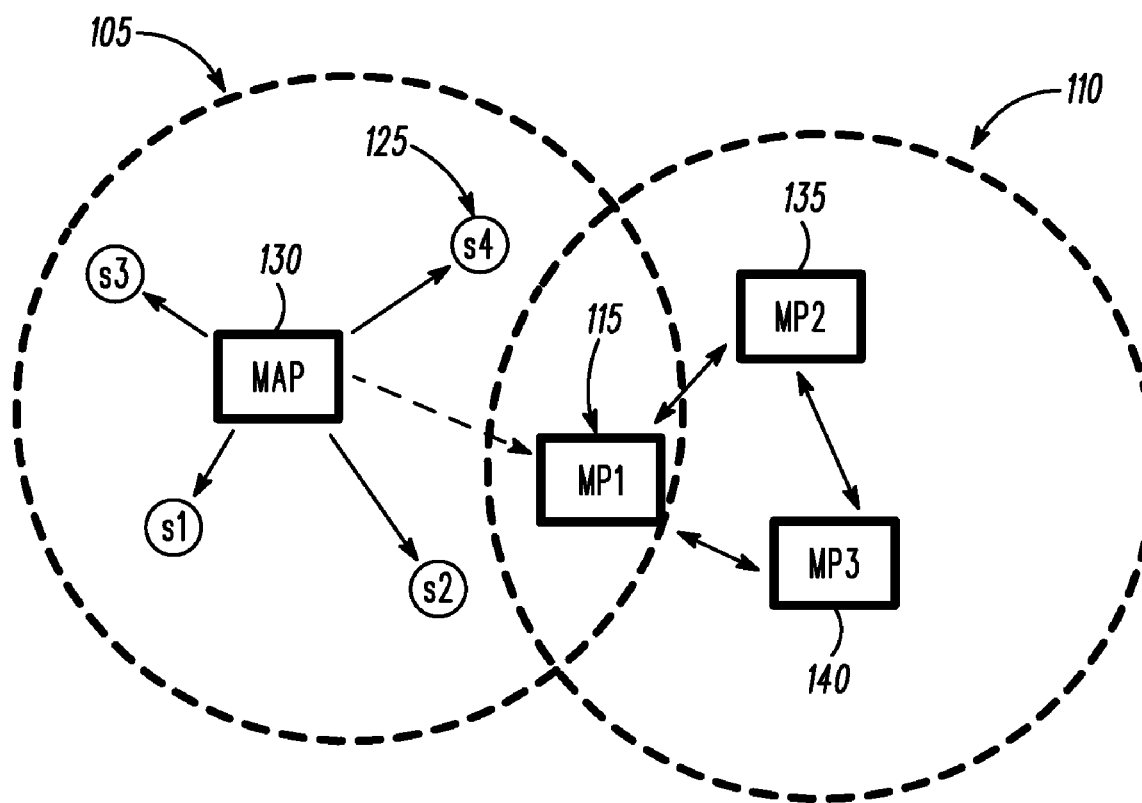

| | | | | |
|---|---|---|---|---|
| 7,400,974 | B2 * | 7/2008 | Fuchs et al. | 701/213 |
| 7,417,971 | B2 * | 8/2008 | Jeong et al. | 370/331 |
| 7,564,826 | B2 * | 7/2009 | Sherman et al. | 370/338 |
| 7,567,544 | B2 * | 7/2009 | Myles et al. | 370/338 |
| 7,583,643 | B2 * | 9/2009 | Smith et al. | 370/338 |
| 2004/0006705 | A1 * | 1/2004 | Walker | 713/200 |
| 2004/0008661 | A1 * | 1/2004 | Myles et al. | 370/350 |
| 2004/0103278 | A1 * | 5/2004 | Abhishek et al. | 713/160 |
| 2004/0246932 | A1 * | 12/2004 | Fischer | 370/338 |
| 2005/0018624 | A1 * | 1/2005 | Meier et al. | 370/318 |
| 2005/0068928 | A1 * | 3/2005 | Smith et al. | 370/338 |
| 2005/0128988 | A1 * | 6/2005 | Simpson et al. | 370/338 |
| 2005/0169233 | A1 * | 8/2005 | Kandala et al. | 370/349 |
| 2005/0208966 | A1 * | 9/2005 | David et al. | 455/553.1 |
| 2005/0245237 | A1 * | 11/2005 | Adachi et al. | 455/411 |
| 2005/0249137 | A1 * | 11/2005 | Todd et al. | 370/311 |
| 2005/0281247 | A1 | 12/2005 | Lim et al. | |
| 2005/0286466 | A1 * | 12/2005 | Tagg et al. | 370/329 |
| 2006/0029028 | A1 * | 2/2006 | Kim et al. | 370/338 |
| 2006/0050742 | A1 * | 3/2006 | Grandhi et al. | 370/506 |
| 2006/0215619 | A1 * | 9/2006 | Peetz et al. | 370/338 |
| 2006/0217076 | A1 * | 9/2006 | Bishop | 455/73 |
| 2006/0217138 | A1 * | 9/2006 | Bishop | 455/502 |
| 2006/0218229 | A1 * | 9/2006 | Pandey et al. | 709/203 |
| 2006/0253736 | A1 * | 11/2006 | Rudolf et al. | 714/12 |
| 2006/0256802 | A1 * | 11/2006 | Edwards | 370/401 |
| 2006/0262932 | A1 * | 11/2006 | Sood et al. | 380/272 |
| 2006/0285527 | A1 * | 12/2006 | Gao et al. | 370/338 |
| 2006/0285528 | A1 * | 12/2006 | Gao et al. | 370/338 |
| 2007/0014269 | A1 * | 1/2007 | Sherman et al. | 370/338 |
| 2007/0091934 | A1 * | 4/2007 | Myles et al. | 370/503 |
| 2007/0189249 | A1 * | 8/2007 | Gurevich et al. | 370/338 |
| 2008/0004076 | A1 * | 1/2008 | Adachi et al. | 455/560 |
| 2008/0144493 | A1 * | 6/2008 | Yeh | 370/230 |

OTHER PUBLICATIONS

Specification of U.S. Appl. No. 60/698,816, filed Jul. 13, 2005; entitled "Synchronization and Beacon strategy for a WLAN mesh network"—9 pages.

IEEE 802.11, "TSF for Infrastructure Networks," Part 11: Wireless LAN Medium Access Control (MAC) and Physical Layer (PHY) Specifications, Section 11.1.1.1, 1999, p. 123.

IEEE 802.11-05/562r0, "Mesh Beaconing," Jun. 2005, p. 96.

GB0616672.2-GB Search Report—Dated Nov. 30, 2006—4 pages.

P3621DE—1st German Office Action (English Translation)—Dated Oct. 30, 2007—2 pages.

Changsu Suh et al., "Enhanced Power Saving for IEEE 802.11 WLAN with Dynamic Slot Allocation." Graduate School of Information & Communication, Ajou Univ., Republic of Korea, 2005, pp. 498-507.

* cited by examiner

TIMING SYNCHRONIZATION AND BEACON GENERATION FOR MESH POINTS OPERATING IN A WIRELESS MESH NETWORK

RELATED APPLICATIONS

The present application is related to and claims benefit under 35 U.S.C. §119(e) from U.S. Provisional Patent Application Ser. No. 60/711,073, filed Aug. 24, 2005, titled "Timing synchronization and beacon generation for mesh points operating in a wireless mesh network," the entire contents of which being incorporated herein by reference.

BACKGROUND

The IEEE 802.11 standard at the time of this filing outlines two mechanisms to provide timing synchronization for stations. In an infrastructure mode of operation, an access point (AP) is the timing master of the basic service set (BSS), and stations always accept the timing synchronization information of the beacon transmitted by the AP. However in independent basic service set (IBSS) mode of operation, the timing synchronization function (TSF) is performed by all stations in a distributed manner and stations in an IBSS adopt the timing received from any beacon or probe response that has a TSF value later than its own TSF timer.

The diversity of devices available in mesh creates an interesting challenge of synchronization and beacon generation because it is difficult to do a strict classification of some mesh devices. While a wireless local area network (WLAN) mesh is expected to reuse the concepts from BSS based AP beaconing and IBSS station beaconing, special attention needs to be given for devices like a mesh point (MP), which may be a wireless device containing an 802.11-conformant MAC and PHY interface to the wireless medium that provides mesh services, and a mesh access point (MAP), which is a MP that is also an access point, and therefore supports both BSS and mesh interface functions. Beacon collisions between multiple MAPs, packet forwarding in presence of power save (PS) MPs are among few areas which need to be addressed.

DESCRIPTION OF EMBODIMENTS

The proposed beacon generation algorithm for mesh networking includes elements of the IEEE 802.11 standard. For example, the MAP follows an infrastructure mode beacon generation algorithm. This gives the MAP enough flexibility to select its own BSS parameters, enables it to transmit a beacon at each beacon interval, and avoids its frequent synchronization with other MPs. Non-AP mesh devices on the other hand follow the IBSS mode of operation for beacon generation when synchronized with other MP.

Referring to FIG. 1, a system diagram shows electronic devices operating in a mesh cluster 110 and an infrastructure network 105, in accordance with some embodiments of the present invention. Operating within the infrastructure network 105 is a MAP 130, and a plurality of basic service set stations s1 ... s4, including s4 125, which may be legacy stations (a legacy station may also be referred to herein as a STA). Operating in the mesh cluster 110 are a plurality of mesh devices including MP1 115, MP2 135, MP3 140. It will be appreciated that both the mesh cluster 110 and infrastructure network 105 may include substantially more connected devices than shown in FIG. 1. Conceptually, a MAP such as MAP 130 may be considered as root of a tree, with all of its associated stations, such as STA 125, as branches. Non-AP MP mesh devices 115, 135, 140 (mesh points that are not an access point) form their own cluster of peer to peer MPs in mesh cluster 110. A non-AP MP may also be associated with one or more MAP devices. This can be viewed as a tree connecting to a peer to peer cluster through a gateway MP, such as MP1 115.

Embodiments of the invention provide a timing synchronization and beacon generation method for mesh points operating in a wireless network, described using a WLAN mesh network as an example. A non-AP mesh point implemented in accordance with the present invention may transmit a mesh point (MP) synchronization capability field in its beacon including one or more of the following subfields: subfields indicating whether it supports synchronization, whether it requests synchronization from peer MPs and whether it is already synchronized with one or more peer MPs. A non-AP MP may indicate that it may be synchronized with peers by setting bits in the MP synchronization capability field indicating that it supports synchronization and that it requests synchronization from peers. If two or more non-AP MP associate that support synchronization and one or more of these MP requests synchronization with its peer, these MP shall synchronize and generate beacons using the IBSS synchronization and beacon generation features in the IEEE 802.11 standard. If neither of the MP advertising that they support synchronization from peers, both may implement run their TSF independent of each other an may generate beacons using the beacon generation function defined in the IEEE 802.11 standard for Infrastructure mode. A MP that allows peers requesting support for PS services to associate may support synchronization and a MP may refuse association with a peer that intends to operate in PS mode if the MP does not indicate that it is supporting synchronization services.

MAP Characteristics

A MAP never enters the PS mode and should not be synchronized to other MP. A MAP independently selects its beacon interval (BI) and delivery traffic indication map (DTIM) periods depending on its BSS needs, and starts its TSF independently of any simultaneously started MAP. A MAP shall treat any associated MP operating in PS mode identical to legacy stations (STA), meaning that the MAP shall assume that the MP will wake up for the DTIM beacon of the MAP in PS operations (ensuring timely delivery of directed and broadcast traffic).

Non-AP MP Characteristics

When synchronization is enabled, non-AP MPs can be viewed as simple STAs operating in the IBSS mode with added mesh services. Otherwise, a non-AP MP may independently select its BI and may start its TSF independently of any simultaneously started MP.

It is optional for a MP to support power save and synchronization. If a MP advertises that it supports synchronization and it requests synchronization with peers, it shall generate beacons and synchronize with other non-AP MP as if operating in IBSS mode as described elsewhere herein. Otherwise, a MP that advertises support for synchronization but is not associated with peers that request synchronization may independently selects its BI and may start its TSF independently of any simultaneously started MP.

Any MP that associates with a MAP and enters PS mode must wake up for the DTIM beacon of the MAP plus any additional beacons it may need to receive based upon the listen interval the MP has negotiated with the MAP. If a MP associates with more than one MAP, it must wake up for the DTIM beacons for each MAP in addition to any Mesh TBTT which may be scheduled for its synchronized MP neighbors.

A MP that allows peers requesting support for PS services to associate shall support synchronization and a MP may refuse association with a peer that intends to operate in PS mode if it is unable to offer synchronization services.

Lightweight MP Characteristics

One type of mesh point currently defined in proposals for mesh networks is a lightweight MP (LW-MP). The beacon generation and synchronization procedure for LW-MP follows the IBSS mode of beacon generation and timing synchronization. If a LW-MP associates with a MAP and enters PS mode, it must wake up for at least the DTIM beacon of the MAP in addition to any Mesh TBTT for its IBSS operation. Alternatively, a lightweight MP may associate with a MAP as a simple STA if it intends to enter PS mode.

For most purposes of this document, the lightweight mesh point may be considered a non-AP mesh point. A lightweight MP should transmit a synchronization capability field in its beacon indicating that it supports synchronization and that it requires synchronization of its peers.

Non-AP MP's may include the MP synchronization capability field in the WLAN mesh capability element of all transmitted beacon and probe response frames indicating if it can support synchronization). A new "MP Synchronization Capability" field within the WLAN Mesh Capability element (Table 1 is used to advertise if a non-AP MP can support synchronization, if a timing synchronization is requested of peer MP and if the MP is already synchronized with another peer MP. It may also be contained in beacons transmitted by non-AP MPs, and is also contained in probe response messages.

TABLE 1

WLAN Mesh Capability Element Fields

| Field | Value/description |
| --- | --- |
| ID | T.B.D |
| Length | Variable |
| Version | 1 |
| Active Protocol ID | Path selection protocol in use |
| Active Metric ID | Path selection metric in use |
| Peer capacity | Peer capacity value |
| Power Save capability | Support for power save operation and current power save status |
| Channel precedence | Channel precedence value |
| Synchronization Capability | If synchronization is supported by this MP |

A format of the synchronization capability field is shown in Table 2.

TABLE 2

Synchronization Capability Field Bits:

| 0 | 1 | 2 | 3-7 |
| --- | --- | --- | --- |
| Supporting Synchronization | Requests Synchronization from Peer | Synchronized with a peer MP | Reserved |

The "Supporting Synchronization" subfield indicates if the non-AP Mesh Point supports timing synchronization with peer MPs. The "Requests Synchronization from Peer" subfield indicates if this mesh point requires non-AP MP peers attempting to associate with it to synchronize with its timing synchronization function (TSF). The "Synchronized with a Peer MP" subfield indicates whether the non-AP MP is currently associated with another MP and whether the two MP have synchronized TSFs.

At a given time, a non-AP MP can operate in either one of the following two states:

Synchronized State (Synch): This Synch state is one for which the MP is synchronized with at least one peer MP or the MP requests synchronization with peer MPs, or both.

Unsynchronized State (UnSynch): If an MP is not synchronized with any peer MP and the MP is not requesting synchronization with peer MPs, then the MP is in an UnSynch state.

The operation in UnSynch state is similar to operation of legacy AP. However an MP can switch from Synch to UnSynch state and vice-versa depending on its synchronization requirements. For example, if a MP in Synch state does not receive a beacon with "Request Synchronization from Peer" set to true for an extended period of time, the MP can switch itself back to the Unsych State and set the Synchronized with a Peer MP indicator to false. We call this period a "RETURN_TO_UNSYNCH_PERIOD". The value of this period is a system parameter and be selected based on the number of MPs, network dynamics and traffic conditions in the mesh.

The timing synchronization function (TSF) keeps the clocks of a non-AP MP synchronized with other MPs. The TSF in a non-AP MP may be implemented via a distributed algorithm. A Non-AP MP in the WLAN mesh may transmit beacons according to the algorithm described herein. A synchronized non-AP MP in WLAN mesh may adopt the timing received from any beacon or probe response that has a TSF value later than its own TSF timer when either the request synchronization from peer or synchronized with a peer MP indicator in the synchronization capability field is set to true.

In any WLAN mesh where it is optional for MPs to associate with peers, a non-AP MP may adopt timing and any other relevant information received in beacon or probe responses transmitted by MPs that are members of the same mesh, and not just with beacon or probe responses that are transmitted from an associated MP.

When MPs are implemented according to the embodiments of the present invention described herein, a MAP should not synchronize with other MP. Instead it should independently select its beacon interval and delivery traffic information map (DTIM) periods and should start its TSF independently of any simultaneously started MAP. MAPs never enter a power save (PS) mode, and therefore need not be synchronized with other MPs. Since a MAP is not synchronized with MPs that request synchronization from peers, A MAP shall treat any associated MP operating in the PS mode identical to legacy stations (STAs), meaning that the MAP shall assume that the MP will wake up for the DTIM beacon of the MAP in PS operations (ensuring timely delivery of directed and broadcast traffic).

Maintaining Synchronization—Beacon Generation

Figure 2:
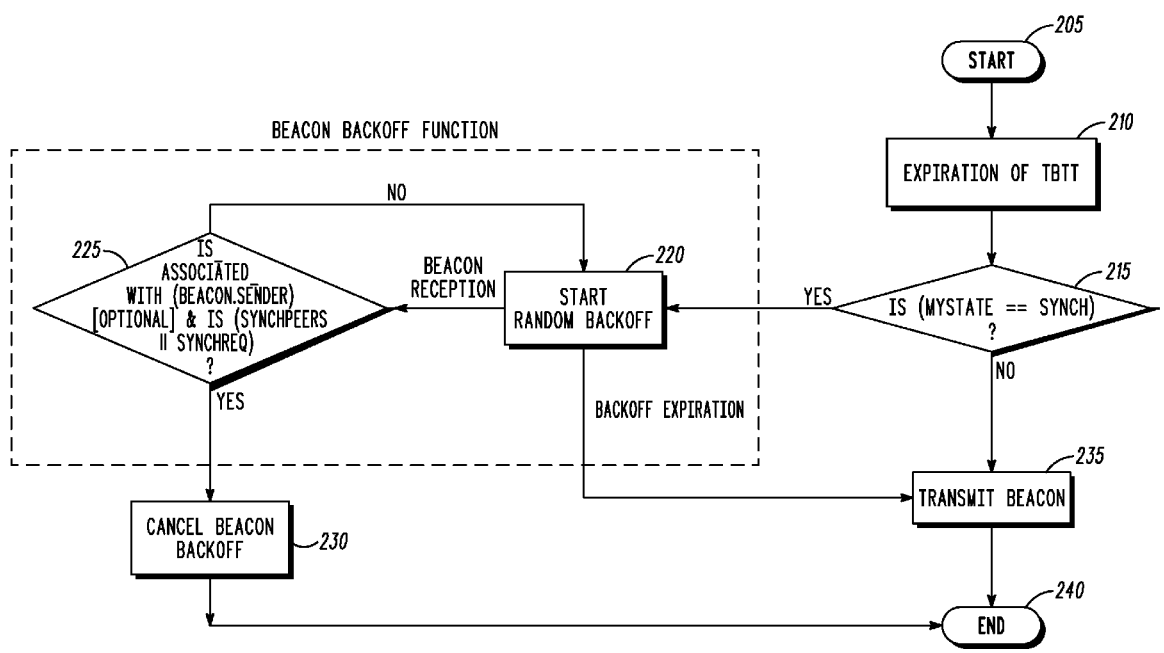

Referring to FIG. 2, a flow chart illustrates a non-AP MP beacon generation procedure, in accordance with some embodiments of the present invention. The procedure is also applicable to a lightweight mesh point.

The beacon (and probe response) generation procedure adopted by a non-AP MP depends on the type of state (synchronized (Synch) or unsynchronized (Unsynch)) it is in, which is determined at step 215. Hereafter, reference to a beacon may be interpreted to be a reference to a beacon or probe response. A synchronized MP (as determined at step 215) attempting to transmit a Beacon or a Probe Response will use a beacon backoff function (steps 220, 225) similar to the access procedure described for IBSS operation in the 802.11-1999 standard (section 11.1.2.2), and 802.11e draft. In particular, an MP that receives a Beacon after a target beacon transmit time (TBTT) from another MP (as measured at step 210) and before being able to send its own may cancel that beacon transmission (at step 230) provided that the MP either requests synchronization from peers or synchronized with a peer MP flag in the synchronization capability field is set to true (as determined at step 225 from the expression "IS(SYNCPEERS∥SYNCREQ)", and optionally, if the beacon was received from an associated MP (as determined at step 225 from the expression "IS_ASSOCIATED_WITH (BEACON SENDER)". Specifically, the following rules apply for beacon transmission.

a. Suspend the decrementing of backoff timers for any non Beacon traffic
    b. Calculate a random delay uniformly distributed over the range of zero and twice aCWmin X aSlot time (aCWmin X aSlot time is a system defined duration).
    c. Wait for the period of random delay, decrementing the random delay timer using the same algorithm as for back off (at step 220).
    d. If a beacon arrives before the random delay timer expires, cancel the remaining random timer delay and the pending beacon transmission (at step 230) if either request synchronization from peer or synchronized with a peer MP flag in the synchronization capability field of the beacon is set to true, and optionally, if the received beacon was received from an associated MP.
    e. Send a beacon (at step 235) if the random delay has expired and no beacon has arrived during the delay period from any MP having either request synchronization from peer or synchronized with a peer MP flag in the synchronization capability field set to true, and optionally, if the received beacon was received from an associated MP.

If a non-AP MP advertises that it supports synchronization or it requests synchronization with peers, it may generate beacons and synchronize with other non-AP MP as if operating in IBSS mode as described above. Otherwise, a non-AP MP may independently selects its beacon interval (BI) and may start its TSF independently of any TSF in an other MP. The beacon generation method in the later case follows the procedure as described in IEEE 802.11 infrastructure mode operation.

In any WLAN mesh where it is optional for MP to associate with peers, a non-AP MP may cancel beacon transmission when a beacon is received from a synchronized peer MP that is not associated with the non-AP MP if the MP transmitting the beacon is a member of the same mesh.

Acquiring Synchronization

A non-AP MP may operate in either a Passive Scanning mode or an Active Scanning mode depending on the current value of a ScanMode parameter of the medium access control (MAC) sublayer management entity (MLME)-SCAN.request primitive.

Upon receipt of the MLME-SCAN.request primitive, a non-AP MP may perform scanning. The mesh identification (ID) parameter indicates the WLAN mesh for which to scan. To become a member of a particular mesh using passive scanning, a non-AP MP may scan for Beacon frames containing that WLAN mesh ID, returning all Beacon frames matching the desired mesh ID in the MeshDescriptionSet parameter of the corresponding MLME-SCAN.confirm primitive with the appropriate bits in the Capabilities Information field. To actively scan, the non-AP MP may transmit Probe frames containing the desired mesh ID. Upon completion of scanning, an MLME-SCAN.confirm is typically issued by the MLME indicating all of the WLAN mesh information received.

Initially a non-AP MP can decide to work either in the Synch or UnSynch state. An MP in the UnSynch state, after receiving a MLME-START.request, selects its own BSS parameter set. However it can take additional measures to avoid beacon collision based on the received beacons from other MP's BI and DTIM period and select its own BSS parameters and TBTT offset accordingly.

Figure 3:
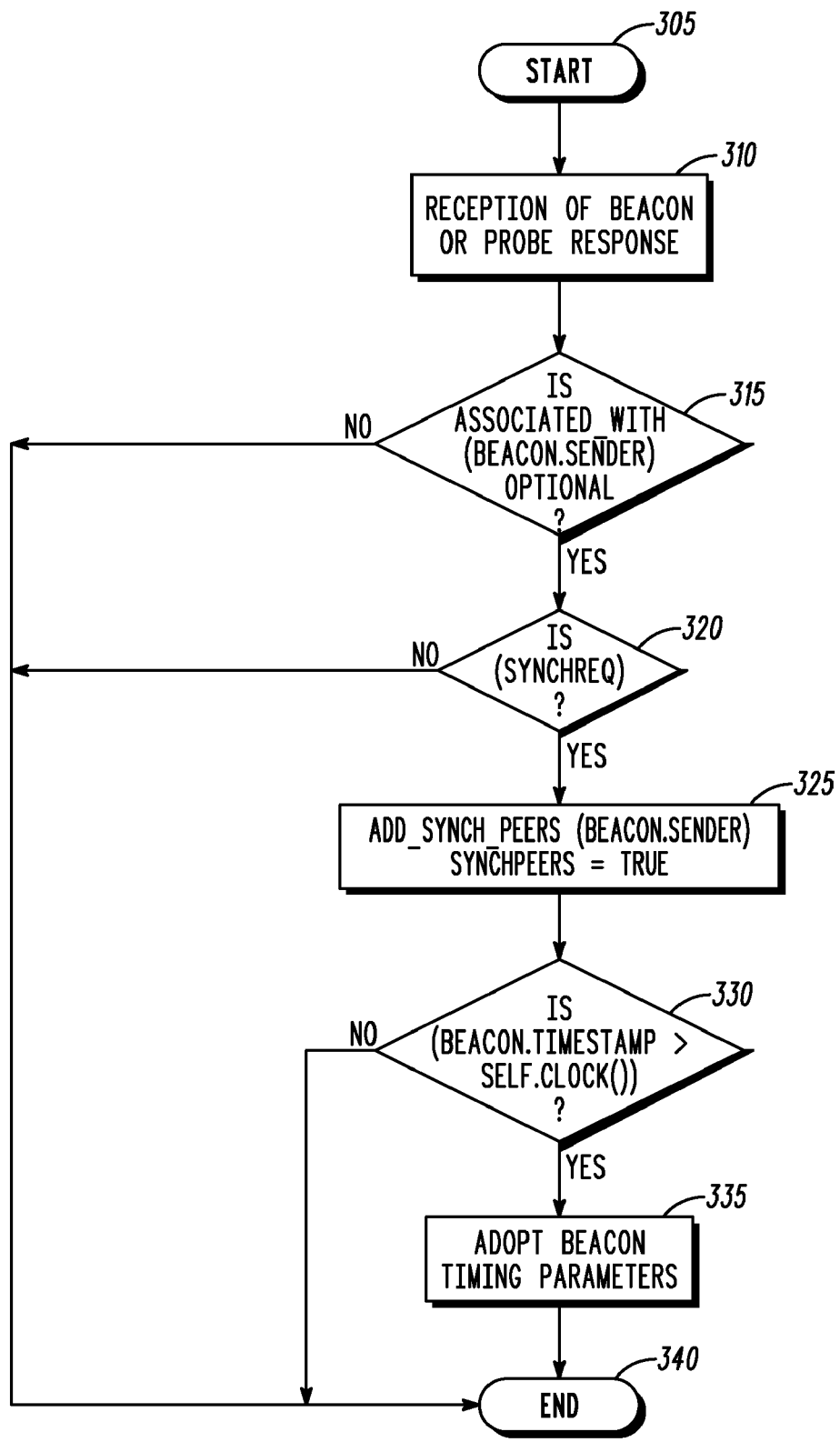

Referring to FIG. 3, a flow chart illustrates the behavior of a non-AP MP after reception of beacon or probe response while in the UnSynch state, in accordance with some embodiments of the present invention. The procedure is also applicable to a lightweight mesh points. At step 310 a beacon or probe response is received by a Non-AP MP. The Non-AP MP adopts the beacon timing parameters at step 335 and stores a value SYNCHPEERS(BEACON.SENDER) at step 325 when the Non-AP MP has determined that the beacon timestamp is greater than the clock of the Non-AP MP at step 330 and that its SYNCHREQ state is TRUE at step 320 and that (optionally) it is associated with the beacon sender at step 315. When the optional step 315 is used and the Non-AP MP determines that it is not associated with the beacon sender, it performs none of steps 320, 325, 330, 335. When the Non-AP MP determines that its SYNCHREQ state is not TRUE at step 320, it performs none of steps 320, 325, 330. When the Non-AP MP determines that the beacon timestamp is not greater than the clock of the Non-AP MP at step 330, it does not perform step 335.

If the non-AP MP that is in an UNSynch state decides to work in the Synch state, it adopts the IBSS parameter set received from a synchronized and optionally associated MP. In the latter case, it may generate beacons as described above.

If a non-AP MP scanning does not result in finding a mesh with the desired mesh ID and of the desired type, or does not result in finding any mesh, the non-AP MP may start its own mesh upon receipt of the MLME-START.request.

Adjusting Timers

In response to an MLME-START.request, a non-AP MP may initialize its TSF timer to 0 and should not transmit a beacon or probe response until it hears a beacon or probe response from a member of the WLAN mesh with a matching mesh ID.

Figure 4:
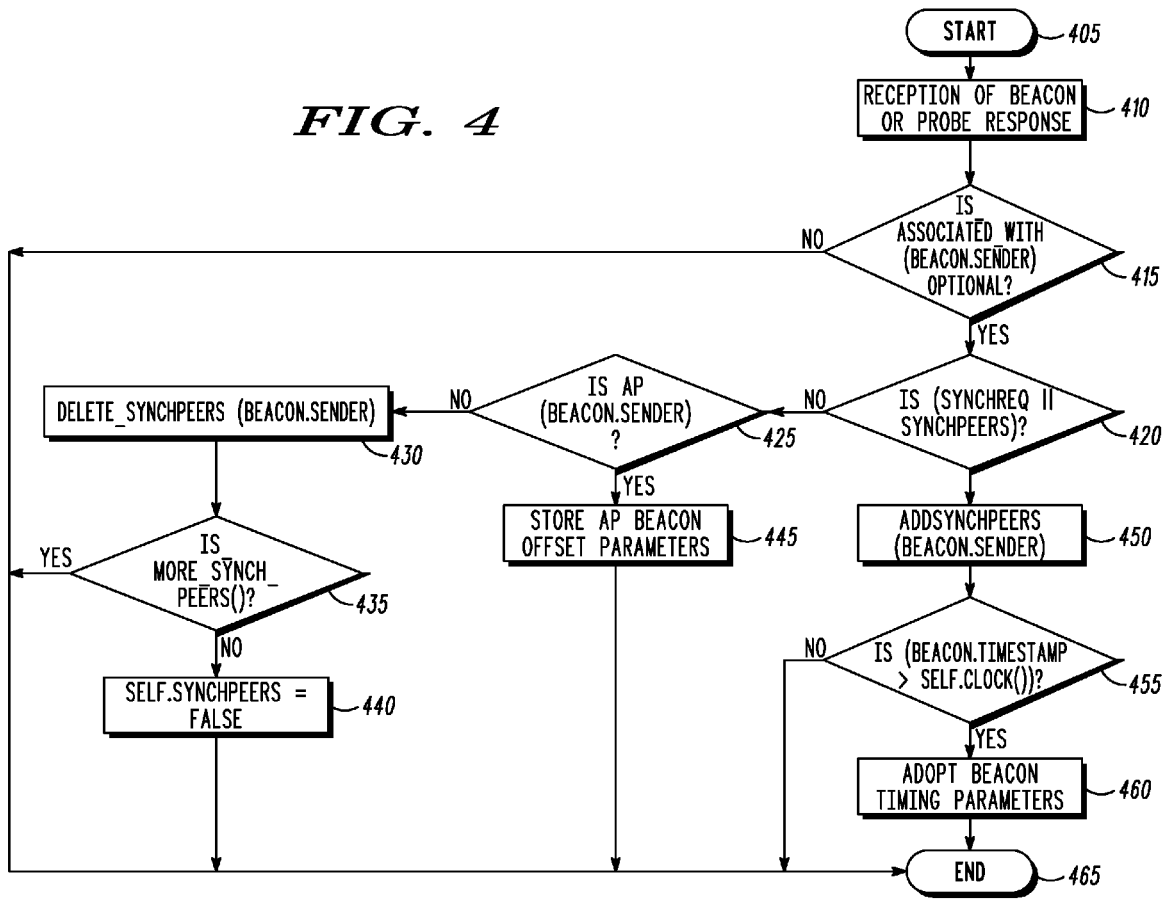

Referring to FIG. 4, a flow chart illustrates the behavior of a non-AP MP after reception of beacon or probe response while in the Synch state. All Beacon and Probe Response frames should carry a Timestamp field. An MP in the Synch state that receives such a frame (at step 410) from another MP in WLAN mesh with the same mesh ID (at step 415) and when either request synchronization from peer or synchronized with a peer MP flag in the synchronization capability field of the other MP is set to true (expressed as IS (SYNCHREQ∥SYNCHPEER)? In step 420), may compare the Timestamp field with its own TSF time at step 455. Optionally, at step 415, the other MP must be an associated MP. If the Timestamp field of the received frame is later than its own TSF time, the MP shall adopt all beacon timing parameters contained in the Beacon frame at step 460. In addition, if a synchronized MP receives a beacon from another MP with "Request Synchronization from Peer" set to false at step 420, and this was the only other MP requesting synchronization, the MP has the option to switch from Synch to UnSynch state at step 440, through steps 425, 430, and 435. Optionally, the other MP must be an associated MP (at step 415).

MP Behavior in Power Save

A non-AP MP that allows peers requesting support for PS services to associate may support synchronization and a non-AP MP may refuse association with a peer that intends to operate in PS mode if it is unable to offer synchronization services.

A non-AP MP that associates with a MAP and enters PS mode should wake up for the DTIM beacon of the MAP plus any additional beacons it may need to receive based upon a listen interval negotiated with the MAP. If a MP associates with more than one MAP, it should wake up for the DTIM and listen-interval beacons for each MAP. This is in addition to any Mesh TBTT which may be scheduled for its synchronized and associated non-AP MP neighbors. Therefore, any MP operating in power save mode and associated with a MAP should track the offset between its internal TSF and the advertised TSF of any MAP with which it is associated together with MAPs DTIM and beacon intervals. Here the offset value equals the difference between the internal TSF and the advertised TSF of any MAP with which it is associated. It may update offset values for neighboring MAP at every TBTT of the neighboring MAP.

Advantages

The embodiments of the present invention described herein are distinct from the prior art because a MP implemented in accordance with the embodiments only synchronizes with non-AP mesh points if one or more of the non-AP mesh points requests synchronization. The present invention permits members of the mesh to predict when other members operating in power save model will be awake to receive directed and broadcast traffic, without requiring the MAP to synchronize with other MP. One of the advantages of the embodiments is that the proposed beacon generation and synchronization scheme is simple to implement and uses already existing mechanisms. The embodiments do not require any complex computation or processing by the MP. The embodiments also protect a MAP, plus the stations and MP associated with a MAP, from an MP that might be non-conformant, either due to imperfect compensation for temperature or aging of the MP crystal oscillator or malicious intent, as an example. These non-conformant MP might otherwise disrupt an entire mesh instead of one small segment. The proposed embodiments provide flexibility to non-AP MP to either share beaconing responsibilities or to individually take control of these functions. For example, it might be appropriate for one segment in a mesh to enable timing synchronization and power save while permitting another segment to restrict such behaviors.

Some Method Aspects of the Embodiments

Referring to FIG. 2 and the description thereof above, a method is used by a mesh point that is one of an access point mesh point, a non-access mesh point and a lightweight mesh point. The method includes formatting a synchronization capability field of one of a beacon and probe response. The synchronization capability field includes an indication of whether the mesh point supports synchronization (SynchSupp), an indication of whether the mesh point requests synchronization from a peer mesh point (SynchReq), and an indication of whether the mesh point is already synchronized with one or more peers (SynchPeers). The method further includes, when the mesh point is one of a non access point mesh point and a lightweight access point, initiating a beacon backoff function upon the expiration of a target beacon transmission timer when at least one of SynchReq and SynchPeers of the mesh point are true, and canceling the beacon backoff function when one of a beacon and probe response from an other mesh point is received in which at least one of SynchReq and SynchPeers of the other mesh point are true.

Referring to FIG. 3 and the description thereof above, a method is used by a mesh point that is one of a non-access point mesh point and a lightweight mesh point. The method includes receiving one of a beacon and probe response from an other mesh point, determining whether the mesh point is in an unsynchronized state, determining from an indicator in the one of the beacon and probe response whether the other mesh point requests synchronization from a peer mesh point (SynchReq), setting a state of whether the mesh point is already synchronized with one or more peers (SynchPeers) to true and performing a beacon timing synchronization function when the mesh point is in the unsynchronized state and the SynchReq of the other mesh point are both true.

Referring to FIG. 4 and the description thereof above, a method is used by a mesh point that is one of a non-access point mesh point and a lightweight mesh point. The method includes receiving one of a beacon and probe response from an other mesh point, determining that the mesh point is in a synchronized state, determining from one or more indicators in the one of the beacon and probe response whether the other mesh point is synchronized, and adding an identity of the other mesh point to a database of beacon senders maintained by the mesh point and performing a beacon timing synchronization function when the mesh point and the other mesh point are both synchronized.

It will be appreciated that embodiments of the invention described herein may be comprised of one or more conventional processors and unique stored program instructions that control the one or more processors to implement, in conjunction with certain non-processor circuits, some, most, or all of the functions of timing synchronization and beacon generation described herein. The non-processor circuits may include, but are not limited to, a radio receiver, a radio transmitter, signal drivers, clock circuits, power source circuits, and user input devices. As such, these functions may be interpreted as steps of a method to perform timing synchronization and beacon generation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method used by a mesh point, comprising:
   formatting a synchronization capability field of one of a beacon and probe response that includes:
   an indication of whether the mesh point supports synchronization (SynchSupp), an indication of whether the mesh point requests synchronization from a peer mesh point (SynchReq);
   an indication of whether the mesh point is already synchronized with one or more peers (SynchPeers); and when the mesh point is one of a non-access point mesh point and a lightweight access point:
  initiating a beacon backoff function upon the expiration of a target beacon transmission timer when at least one of SynchReq and SynchPeers of the mesh point are true; and
  cancelling the beacon backoff function when one of a beacon and probe response from an other mesh point is received in which at last one of SynchReq and SynchPeers of the other mesh point are true.

2. The method according to claim 1, wherein the mesh point is one of an access point, a non-access point, and a lightweight mesh point.

3. The method according to claim 1, wherein the initiating of the beacon backoff function comprises initiating a random backoff function.

4. The method according to claim 1, further comprising:
  transmitting a beacon upon the expiration of the target beacon transmission time when both of SynchReq and SynchPeers of the mesh point are false.

5. The method according to claim 1, wherein the canceling of the beacon backoff function is not performed when the mesh point is not associated with the other mesh point.

6. The method according to claim 1, further comprising transmitting a beacon when a random backoff timer of the beacon transmission function expires.

7. A method used by mesh point that is one of a non-access point mesh point and a lightweight mesh point, comprising:
  receiving one of a beacon and probe response from an other mesh point;
  determining whether the mesh point is in an unsynchronized state; wherein the mesh point is in an unsynchronized state when both SynchReq and SynchPeers of the mesh point are false;
  determining from an indicator in the one of the beacon and probe response whether the other mesh point requests synchronization from a peer mesh point (SynchReq);
  setting a state of whether the mesh point is already synchronized with one or more peers (SynchPeers) to true and performing a beacon timing synchronization function when the unsynchronized state of the mesh point and the SynchReq of the other mesh point are both true.

8. The method according to claim 7, wherein neither the setting the state of SynchPeers to true nor performing the beacon timing synchronization function are performed when the mesh point is not associated with the other mesh point.

9. The method according to claim 7, wherein the setting of the state further comprises adding an identity of the other mesh point to a database of mesh points that are beacon senders maintained by the non-access point mesh point.

10. A method used by a mesh point that is one of a non-access point mesh point and a lightweight mesh point, comprising:
  receiving one of a beacon and probe response from an other mesh point;
  determining that the mesh point is in a synchronized state;
  determining from one or more indicators in the one of the beacon and probe response whether the other mesh point is synchronized;
    wherein the one or more indicators in the one of the beacon and probe response comprise an indication of whether the other mesh point requests synchronization from a peer mesh point (SynchReq), and
    an indication of whether the other mesh point is already synchronized with one or more peers (SynchPeers), and the other mesh point is synchronized when at least one of SynchReq and SynchPeers of the other mesh point is true;
  adding an identity of the other mesh point to a database of beacon senders maintained by the mesh point and performing a beacon timing synchronization function when the mesh point and the other mesh point are both synchronized.

11. The method according to claim 10, wherein the adding of the identity of the other mesh point and the performing of the beacon timing function are further dependent upon the mesh point and the other mesh point being associated.

12. The method according to claim 10, further comprising:
  determining whether the other mesh point is an access point, and
  storing the difference between a timing synchronization function of the other mesh point and a timing synchronization function of the mesh point as a beacon offset value and storing the delivery traffic indication map and beacon intervals when the other access point is an access point mesh point and the other mesh point is not in a synchronized state.

13. The method according to claim 10, further comprising:
  determining whether the other mesh point is an access point mesh point, and deleting an identity of the other mesh point from a database of beacon senders maintained by the mesh point when the other mesh point is a non-access point mesh point and the other mesh point is not in a synchronized state.

* * * * *

UNITED STATES PATENT AND TRADEMARK OFFICE
CERTIFICATE OF CORRECTION

PATENT NO. : 7,706,822 B2
APPLICATION NO. : 11/460017
DATED : April 27, 2010
INVENTOR(S) : Emeott et al.

Page 1 of 1

It is certified that error appears in the above-identified patent and that said Letters Patent is hereby corrected as shown below:

Title Page, Item (75), under "Inventors", in Column 1, Line 2, delete "Gossian," and insert -- Gossain, --, therefor.

IN THE SPECIFICATION

In Column 4, Line 20, delete "Unsych" and insert -- UnSynch --, therefor.

In Column 4, Line 64, delete "(Unsynch))" and insert -- (UnSynch)) --, therefor.

In Column 5, Line 18, delete "traffic" and insert -- traffic. --, therefor.

In Column 6, Line 34, delete "UNSych" and insert -- UnSynch --, therefor.

IN THE CLAIMS

In Column 9, Line 9, in Claim 1, delete "at last" and insert -- at least --, therefor.

Signed and Sealed this
Twelfth Day of June, 2012

David J. Kappos
*Director of the United States Patent and Trademark Office*